(12) United States Patent
Zhou

(10) Patent No.: US 11,954,397 B2
(45) Date of Patent: Apr. 9, 2024

(54) DISPLAY PANEL AND DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Mingjun Zhou, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 681 days.

(21) Appl. No.: 16/968,862

(22) PCT Filed: May 29, 2020

(86) PCT No.: PCT/CN2020/093397
§ 371 (c)(1),
(2) Date: Aug. 10, 2020

(87) PCT Pub. No.: WO2021/196391
PCT Pub. Date: Oct. 7, 2021

(65) Prior Publication Data
US 2023/0176808 A1    Jun. 8, 2023

(30) Foreign Application Priority Data
Mar. 31, 2020 (CN) .......................... 202010240089.4

(51) Int. Cl.
*G06F 3/147* (2006.01)
*G06F 3/14* (2006.01)

(52) U.S. Cl.
CPC ............ *G06F 3/147* (2013.01); *G06F 3/1446* (2013.01)

(58) Field of Classification Search
CPC ......... G06F 2203/04103; G06F 1/1637; G06F 3/041; G02F 1/133308; G02F 1/133331;
(Continued)

(56) References Cited

U.S. PATENT DOCUMENTS

| 9,513,501 B2 | 12/2016 | Yu et al. |
| 2011/0141379 A1* | 6/2011 | Ichioka .................... G09G 5/00 348/841 |

(Continued)

FOREIGN PATENT DOCUMENTS

| CN | 103677359 A | 3/2014 |
| CN | 106257680 A | 12/2016 |

(Continued)

OTHER PUBLICATIONS

International Search Report in International application No. PCT/CN2020/093397, dated Dec. 30, 2020.
(Continued)

*Primary Examiner* — Koosha Sharifi-Tafreshi
(74) *Attorney, Agent, or Firm* — PV IP PC; Wei Te Chung; Zhigang Ma

(57) ABSTRACT

A display panel and a display device are provided. In the display panel, a display module includes a first display area and a second display area. The first display area is used to display video images, the second display area is used to display decorative images, and the second display area is positioned on an outer peripheral side of the first display area. A bonding adhesive is transparent and is at least pasted on the second display area, and a cover plate is pasted on the bonding adhesive. The second display area is an appearance display area.

18 Claims, 2 Drawing Sheets

(58) Field of Classification Search
CPC ........... G02F 2202/28; G02F 1/133514; G02F 1/133512; G02F 1/1333; B32B 37/12; B32B 2457/208; B32B 2037/1253; B32B 2307/412; B32B 2457/202; B32B 37/1207; B32B 7/14; B32B 7/12; B32B 27/308; B32B 2457/206; B32B 2457/20; B32B 2250/44; B32B 17/10
See application file for complete search history.

(56) References Cited

U.S. PATENT DOCUMENTS

| | | | |
|---|---|---|---|
| 2012/0200820 A1 | 8/2012 | Sato et al. | |
| 2014/0132539 A1 | 5/2014 | Huang | |
| 2014/0234594 A1* | 8/2014 | Ito | B32B 7/12 |
| | | | 428/203 |
| 2018/0267345 A1 | 9/2018 | Chen | |
| 2019/0016105 A1* | 1/2019 | Ouderkirk | B32B 37/0076 |
| 2019/0348630 A1 | 11/2019 | Jung et al. | |
| 2020/0019017 A1* | 1/2020 | Kyoukane | G02F 1/133611 |
| 2020/0082750 A1* | 3/2020 | Lv | G09G 3/2074 |

FOREIGN PATENT DOCUMENTS

| | | |
|---|---|---|
| CN | 106534566 A | 3/2017 |
| CN | 106918945 A | 7/2017 |
| CN | 207883219 U | 9/2018 |
| CN | 110045863 A | 7/2019 |
| CN | 110208976 A | 9/2019 |
| CN | 110501838 A | 11/2019 |
| CN | 110610654 A | 12/2019 |
| TW | M472241 U | 2/2014 |

OTHER PUBLICATIONS

Written Opinion of the International Searching Authority in International application No. PCT/CN2020/093397, dated Dec. 30, 2020.

Chinese Office Action issued in corresponding Chinese Patent Application No. 202010240089.4 dated Sep. 30, 2020, pp. 1-8.

* cited by examiner

DISPLAY PANEL AND DISPLAY DEVICE

RELATED APPLICATIONS

This application is a Notional Phase of PCT Patent Application No. PCT/CN2020/093397 having international filing date of May 29, 2020, which claims the benefit of priority of Chinese Patent Application No. 202010240089.4 filed on Mar. 31, 2020. The contents of the above applications are all incorporated by reference as if fully set forth herein in their entirety.

FIELD OF INVENTION

The present application relates to the field of display technology, in particular to a display panel and a display device.

BACKGROUND OF INVENTION

Traditional display panel bonding solution is that a cover plate and a display module are bonded with bonding adhesive and then subjected to a curing process. However, due to presence of black ink on the cover plate, it is prone to cause poor curing and results in separation issues. The current method is to increase an aperture ratio of shielding ink on the cover plate to improve curing area and curing strength. However, 100% curing also results in a relatively low bonding strength, and increasing the aperture ratio of the shielding ink causes wiring to be seen and not achieve a standard of overall black appearance.

Technical Problem

Embodiments of the present application provide a display panel and a display device to solve the technical problem of poor curing of the bonding adhesive between the cover plate and the display module in the current display panel.

SUMMARY OF INVENTION

An embodiment of the present application provides a display panel, including: a display module including a first display area and a second display area, wherein the first display area is configured to display video images, the second display area is configured to display decorative images, and the second display area is positioned on an outer peripheral side of the first display area; a bonding adhesive, wherein the bonding adhesive is transparent, and the bonding adhesive is at least pasted on the second display area; and a cover plate pasted on the bonding adhesive; wherein the second display area is an appearance display area.

In the display panel of the embodiment of the present application, the display module includes: a storage module configured to store at least one of the decorative images; a display module configured to display a corresponding decorative image; an acquisition module configured to obtain image information selected by a user and transmit the image information out; and a control module configured to copy the corresponding decorative image in the storage module according to the image information to form a copying image, and transmit the copying image to the display module.

In the display panel of the embodiment of the present application, the control module includes: a receiving unit configured to receive the image information transmitted by the acquisition module and issue a copying instruction; and a copying unit configured to copy the corresponding decorative image in the storage module to form a copying image according to the copying instruction, and transmit the copying image to the display module.

In the display panel of the embodiment of the present application, the decorative images include at least one of a solid color image, a pattern image, or an image in which color and pattern combine.

In the display panel of the embodiment of the present application, the solid color image is a black image or a gray image.

In the display panel of the embodiment of the present application, the second display area surrounds the outer peripheral side of the first display area to form a frame.

In the display panel of the embodiment of the present application, a width of the frame of the second display area ranges between 4 mm and 12 mm.

In the display panel of the embodiment of the present application, the display module further includes a non-display area surrounding the outer peripheral side of the second display area.

In the display panel of the embodiment of the present application, the bonding adhesive is pasted within the second display area.

In the display panel of the embodiment of the present application, the bonding adhesive is pasted on the first display area and the second display area.

The present application also relates to a display device including the display panel of the above embodiment. That is, specifically, the display panel includes the following features. The display panel includes: a display module including a first display area and a second display area, wherein the first display area is configured to display video images, the second display area is configured to display decorative images, and the second display area is positioned on an outer peripheral side of the first display area; a bonding adhesive, wherein the bonding adhesive is transparent, and the bonding adhesive is at least pasted on the second display area; and a cover plate pasted on the bonding adhesive; wherein, the second display area is an appearance display area.

In the display device of the embodiment of the present application, the display module includes: a storage module configured to store at least one of the decorative images; a display module configured to display a corresponding decorative image; an acquisition module configured to obtain image information selected by a user and transmit the image information out; and a control module configured to copy the corresponding decorative image in the storage module according to the image information to form a copying image, and transmit the copying image to the display module.

In the display device of the embodiment of the present application, the control module includes: a receiving unit configured to receive the image information transmitted by the acquisition module and issue a copying instruction; and a copying unit configured to copy the corresponding decorative image in the storage module to form a copying image according to the copying instruction, and transmit the copying image to the display module.

In the display device of the embodiment of the present application, the decorative images include at least one of a solid color image, a pattern image, or an image in which color and pattern combine.

In the display device of the embodiment of the present application, the solid color image is a black image or a gray image.

In the display device of the embodiment of the present application, the second display area surrounds the outer peripheral side of the first display area to form a frame.

In the display device of the embodiment of the present application, a width of the frame of the second display area ranges between 4 mm and 12 mm.

In the display device of the embodiment of the present application, the display module further includes a non-display area surrounding the outer peripheral side of the second display area.

In the display device of the embodiment of the present application, the bonding adhesive is pasted within the second display area.

In the display device of the embodiment of the present application, the bonding adhesive is pasted on the first display area and the second display area.

Beneficial Effect

The display panel and display device of the present application add a second display area for displaying decorative images so that the appearance of the display panel can display different decorative images through the second display area to change colors or patterns of the appearance frame. In addition, the process of coating black ink on the cover plate is eliminated, so that the bonding adhesive can be completely cured when it is subjected to a photocuring process.

DESCRIPTION OF DRAWINGS

In order to more clearly explain the embodiments of the present application or the technical solutions in the prior art, the following description briefly introduces the drawings required in the embodiments. The drawings in the following description are only some embodiments of the present application. For those of ordinary skill in the art, other drawings can be obtained based on these drawings, without doing any creative work.

DETAILED DESCRIPTION OF PREFERRED EMBODIMENTS

Figure 1:
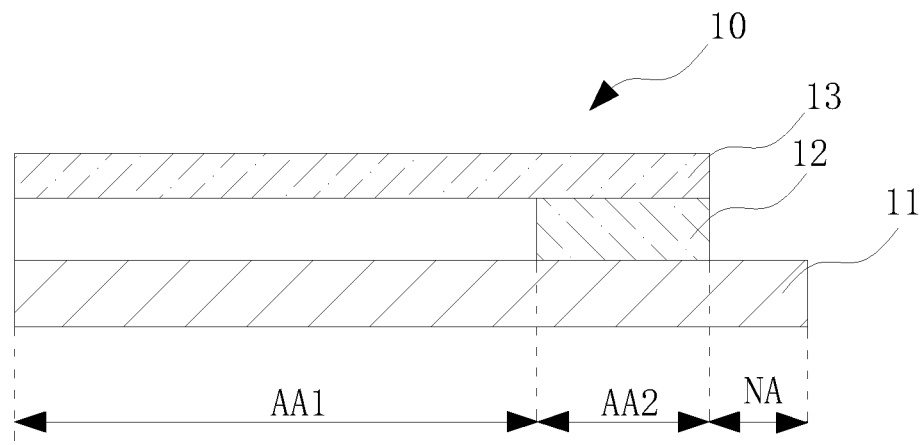
FIG. 1 is a schematic structural diagram showing a cross-sectional view of a display panel according to an embodiment of the present application.

The technical solutions in the embodiments of the present application will be clearly and completely described below with reference to the drawings in the embodiments of the present application. Obviously, the embodiments are only a part of the embodiments of the present application, but not all the embodiments. Based on these embodiments of the present application, other embodiments obtained by those skilled in the art without doing creative work fall into the protection scope of the present application.

In the description of this application, it should be understood that the orientations or positional relationships indicated by the terms "center", "longitudinal", "transverse", "length", "width", "thickness", "above", "below", "front", "back", "left", "right", "vertical", "horizontal", "top", "bottom", "inner", "outer", "clockwise", "counterclockwise" etc., are based on those shown in the drawings. It is only for the convenience of describing the present application and simplifying the description, rather than indicating or implying that the device or element referred to must have a specific orientation, be constructed and operate in a specific orientation, and therefore cannot be construed as a limitation of the present application. In addition, the terms "first" and "second" are used for descriptive purposes only, and cannot be understood as indicating or implying relative importance or implicitly indicating the number of technical features indicated. Thus, the features defined as "first" and "second" may explicitly or implicitly include one or more of the features. In the description of this application, the meaning of "plurality" is two or more, unless otherwise specifically limited.

In the description of this application, it should be noted that, unless otherwise specified and limited, the terms "installation", "connected", and "connection" should be understood in a broad sense. For example, it can be fixed or detachable connected, or connected integrally. It can be a mechanical connection, an electrical connection or can communicate with each other. It can be directly connected or indirectly connected through an intermediate medium. It can be the connection between two elements or the interaction between two elements. Those of ordinary skill in the art can understand the specific meanings of the above terms in this application according to specific situations.

In this application, unless otherwise clearly specified and defined, the first feature "above" or "below" the second feature may include the first feature and the second feature in direct contact, it may also include that the first feature and the second feature are not in direct contact but are in contact through another feature between them. Moreover, the first feature is "higher", "above" and "on" the second feature includes that the first feature is directly above and obliquely above the second feature, or simply means that the first feature is higher in level than the second feature. The first feature is "lower", "below" and "under" the second feature includes that the first feature is directly below and obliquely below the second feature, or simply means that the first feature is lower in level than the second feature.

The following disclosure provides many different embodiments or examples for implementing different structures of the present application. In order to simplify the disclosure of the present application, the components and settings in specific embodiments are described below. Certainly, they are only embodiments and are not to limit this application. Moreover, the present application may repeat reference numerals and/or reference letters in different embodiments. Such repetition is for simplicity and clarity and does not indicate the relationship between the various embodiments and/or settings discussed. In addition, the present application provides embodiments of various specific processes and materials, but those of ordinary skill in the art may consider the application of other processes and/or the use of other materials.

Please refer to FIG. 1, which is a schematic structural diagram of a top view of a display panel according to an embodiment of the present application. An embodiment of the present application provides a display panel 100, which includes a display module 11, a bonding adhesive 12, and a cover plate 13. The display module 11 includes a display panel body and a touch structure. The display panel body may be a liquid crystal display panel body or an organic light-emitting display panel body.

The display module 11 includes a first display area AA1 and a second display area AA2. The first display area AA1 is used to display video images. The second display area AA2 is used to display decorative images. The second display area AA2 is positioned on an outer peripheral side of the first display area AA1.

The bonding adhesive 12 is transparent. The bonding adhesive 12 at least adheres to the second display area. The cover plate 13 is adhered to the bonding adhesive 12.

Wherein, the second display area AA2 is an appearance display area.

In this embodiment, the cover plate of the prior art corresponding to the second display area AA2 is provided with a frame area coated with black ink. The display panel 100 of this embodiment adds a second display area AA2 for displaying decorative images so that the appearance of the display panel 100 can display different decorative images through the second display area AA2 to change colors or patterns of the appearance frame. In addition, a process of coating black ink on the cover plate is eliminated, so that the bonding adhesive 12 can be completely cured when it is subjected to a photocuring process.

Figure 2:
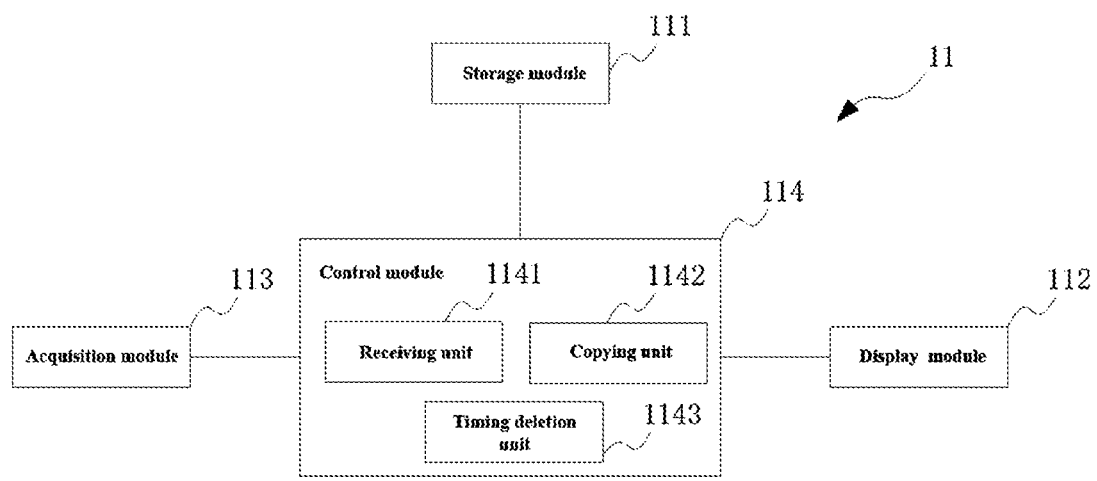
FIG. 2 is a schematic structural diagram of a display panel according to an embodiment of the present application.

Please refer to FIG. 2, in the display panel 100 of this embodiment of the present application, the display module 11 includes a storage module 111, a display module 112, an acquisition module 113, and a control module 114.

The storage module 111 is used to store at least one decorative image. In this embodiment, multiple decorative images are stored in the storage module 111. The decorative images include at least one of a solid color image, a pattern image, or an image in which color and pattern combine. In this embodiment, the solid color image may be a black image or a gray image, but it is not limited thereto.

Further, the decorative images include a shielding portion, and the shielding portion correspondingly covers the wiring in the second display area AA2 to shield the wiring. The color of the shielding portion may be black, gray, or other colors with shielding properties, and the shape of the shielding portion may be a line or a patterned color block.

A display module 112 is configured to display the corresponding decorative image. An acquisition module 113 is configured to obtain image information selected by a user and transmit the image information out. A control module 114 is configured to copy the corresponding decorative image in the storage module 111 according to the image information to form a copying image and transmit the copying image to the display module 112.

Specifically, the control module 114 includes a receiving unit 1141, a copying unit 1142, and a timing deletion unit 1143. The receiving unit 1141 is configured to receive the image information sent by the acquiring module 113 and issue a copying instruction.

The copying unit 1142 is configured to copy the corresponding decorative image in the storage module 111 according to the copying instruction to form a copying image and transmit the copying image to the display module 112. In this embodiment, the copying unit 1142 is used to copy the decorative image to store the decorative image, so as to prevent data abnormality and loss of the decorative image.

The timing deletion unit 1143 is used to delete the copying image at a set time after the display module 112 displays the corresponding decorative image to save memory space. The set time can be 30 minutes, 1 hour, 3 hours, 6 hours, 12 hours, 1 day, one week, or one month, but it is not limited thereto.

In this embodiment, the second display area AA2 surrounds the outer periphery side of the first display area AA1 to form a frame shape. A width of the frame in the second display area AA2 is between 4 mm (including 4 mm) and 12 mm (including 12 mm). Optionally, the width of the frame can be 5 mm, 6 mm, 7 mm, 8 mm, 9 mm, 10 mm, or 11 mm, but is not limited thereto.

In this embodiment, the cover plate 13 is completely transparent. In addition, the display module 11 further includes a non-display area NA, which surrounds the outer peripheral side of the second display area AA2. The bonding adhesive 12 does not extend into the non-display area NA.

In this embodiment, the periphery area of the cover plate 13 is also provided with patterned ink or solid color ink, and the black ink is used to shield the wiring in the non-display area NA. It should be noted that the wiring includes fan-out wiring and GOA circuit wiring. The appearance color of the periphery area of the cover plate 13 matches the appearance color of the second display area, or they are both in one solid color, such as black.

Figure 3:
FIG. 3 is a schematic diagram of a rear view of a cover plate of a display panel according to another embodiment of the present application.

In some embodiments, please refer to FIG. 3, at least one side of the cover plate 13 is still screen printed with patterned black ink 131. The black ink 131 is disposed corresponding to the second display area AA2 and covers the bonding adhesive 12 in the corresponding area. At this time, the second display area AA2 displays a pure black image and forms an integrated solid color with the black ink 131.

In the display panel 100 of this embodiment, the bonding adhesive 12 is pasted in the second display area AA2. That is, the cover plate 13 is pasted to the display module 11 through a frame bonding method.

In some embodiments, the bonding adhesive 12 is pasted on the first display area AA1 and the second display area AA2. That is, the cover plate 13 is attached to the display module 11 in a fully attached manner.

The present application also relates to a display device including the display panel of the above embodiment. That is, the structure of the display panel of the display device of this embodiment is the same as that of the display panel 100 of the above embodiment, which will not be repeated here.

The display panel and the display device of the present application add a second display area displaying decorative images so that the appearance of the display panel can display different decorative images by the second display area to change colors or patterns of the frame. In addition, the process of coating black ink on the cover plate is eliminated, so that the bonding adhesive can be completely cured when performing photocuring.

The display panel and display device provided by the embodiments of the present application have been described in detail above. In this article, specific examples are used to explain the principle and implementation of the present application. The descriptions of the embodiments are only used to help understand the technical solutions and core ideas of the present application. Those of ordinary skill in the art should understand that they can still modify the technical solutions described in the foregoing embodiments, or equivalently substitute some of the technical features. However, these modifications or substitutions do not deviate the essence of the corresponding technical solutions from the scope of the technical solutions in the embodiments of the present application.

What is claimed is:
1. A display panel, comprising:
 a display module comprising a first display area and a second display area, wherein the first display area is configured to display video images, the second display area is configured to display only decorative images, and the second display area is positioned on an outer peripheral side of the first display area;

a bonding adhesive, wherein the bonding adhesive is transparent, and the bonding adhesive at least adheres to the second display area; and a cover plate pasted on the bonding adhesive;

wherein, the second display area is an appearance display area and is capable of acting only as a frame area of the display panel, wherein the display module comprises:

a storage module configured to store at least one of the decorative images;

a display module configured to display a corresponding decorative image; and a control module configured to copy the corresponding decorative image in the storage module according to image information selected by a user to form a copying image, and transmit the copying image to the display module.

2. The display panel according to claim 1, wherein the control module comprises:

a receiving unit configured to receive the image information selected by the user and issue a copying instruction; and a copying unit configured to copy the corresponding decorative image in the storage module to form the copying image according to the copying instruction, and transmit the copying image to the display module.

3. The display panel according to claim 1, wherein the decorative images comprise at least one of a solid color image, a pattern image, or an image in which color and pattern combine.

4. The display panel according to claim 3, wherein the solid color image is a black image or a gray image.

5. The display panel according to claim 1, wherein the second display area surrounds the outer peripheral side of the first display area to form a frame.

6. The display panel according to claim 5, wherein a width of the frame of the second display area ranges between 4 mm and 12 mm.

7. The display panel according to claim 5, wherein the display module further comprises a non-display area surrounding an outer peripheral side of the second display area.

8. The display panel according to claim 1, wherein the bonding adhesive is pasted within the second display area.

9. The display panel according to claim 1, wherein the bonding adhesive is pasted on the first display area and the second display area.

10. A display device, comprising a display panel, wherein the display panel comprises:

a display module comprising a first display area and a second display area, wherein the first display area is configured to display video images, the second display area is configured to display only decorative images, and the second display area is positioned on an outer peripheral side of the first display area;

a bonding adhesive, wherein the bonding adhesive is transparent, and the bonding adhesive is at least pasted on the second display area; and a cover plate pasted on the bonding adhesive;

wherein, the second display area is an appearance display area and is capable of acting only as a frame area of the display panel, wherein the display module comprises:

a storage module configured to store at least one of the decorative images;

a display module configured to display a corresponding decorative image; and a control module configured to copy the corresponding decorative image in the storage module according to image information selected by a user to form a copying image, and transmit the copying image to the display module.

11. The display device according to claim 10, wherein the control module comprises:

a receiving unit configured to receive the image information selected by the user and issue a copying instruction; and a copying unit configured to copy the corresponding decorative image in the storage module to form a copying image according to the copying instruction, and transmit the copying image to the display module.

12. The display device according to claim 10, wherein the decorative images comprise at least one of a solid color image, a pattern image, or an image in which color and pattern combine.

13. The display device according to claim 12, wherein the solid color image is a black image or a gray image.

14. The display device according to claim 10, wherein the second display area surrounds the outer peripheral side of the first display area to form a frame.

15. The display device according to claim 14, wherein a width of the frame of the second display area ranges between 4 mm and 12 mm.

16. The display device according to claim 14, wherein the display module further comprises a non-display area surrounding an outer peripheral side of the second display area.

17. The display device according to claim 10, wherein the bonding adhesive is pasted within the second display area.

18. The display device according to claim 10, wherein the bonding adhesive is pasted on the first display area and the second display area.

* * * * *